US008055701B2

(12) United States Patent  
Carlson et al.

(10) Patent No.: US 8,055,701 B2  
(45) Date of Patent: Nov. 8, 2011

(54) INTERACTIVE DOCUMENT INFORMATION STORAGE AND DELIVERY

(75) Inventors: Jason D. Carlson, Redmond, WA (US); Brian Lee Welcker, Seattle, WA (US); Tudor M. Trufinescu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1717 days.

(21) Appl. No.: 11/172,203

(22) Filed: Jun. 29, 2005

(65) Prior Publication Data

US 2007/0006066 A1    Jan. 4, 2007

(51) Int. Cl.  
*G06F 15/16* (2006.01)
(52) U.S. Cl. .................... 709/203; 709/217; 709/223
(58) Field of Classification Search .................. 709/203, 709/217, 223, 224; 707/3, 10  
See application file for complete search history.

(56) References Cited

U.S. PATENT DOCUMENTS

| 6,219,679 | B1* | 4/2001 | Brisebois et al. | 715/206 |
| 6,353,823 | B1* | 3/2002 | Kumar | 707/3 |
| 6,486,895 | B1* | 11/2002 | Robertson et al. | 715/776 |
| 7,363,340 | B2* | 4/2008 | Agarwalla et al. | 709/203 |
| 7,447,771 | B1* | 11/2008 | Taylor | 709/225 |
| 7,461,064 | B2* | 12/2008 | Fontoura et al. | 1/1 |

* cited by examiner

*Primary Examiner* — Lashonda Jacobs  
(74) *Attorney, Agent, or Firm* — Woodcock Washburn LLP

(57) ABSTRACT

Indexing and storage of context of a plurality of interactive points within an interactive document is provided. The context of the interactive points within the document is stored in a server such that it can be located by the server via the index. Furthermore, information may be received at the server identifying context data for an interactive point stored in the server upon a user activating the interactive point within the document. The server may then transmit to a client the context data stored by the server identified by the information received.

19 Claims, 6 Drawing Sheets

INTERACTIVE DOCUMENT INFORMATION STORAGE AND DELIVERY

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright @ 2005, Microsoft Corp.

BACKGROUND

Interactive applications or documents such as those appearing on the World Wide Web (WWW) containing hypertext need to contain a large amount of information to enable the interactivity. Hypertext is the organization of information units into connected associations that a user can choose to make. An instance of such an association is called a link and may be a hypertext link, for example. The information associated with each link is often stored within the document itself and the target information associated with each link can again have more links associated with it.

Each document can have any number of interactive points such as these links and others and is continuing to increase with the complexity and availability of digital information. The storage and retrieval of such information is of importance because the efficiency of providing interactive documents and applications with a large number of interactive points is often dependant on how large the interactive document is. This is compounded when the interactive documents are dynamically generated so that the number of permutations becomes unmanageable. One solution has been to store all of the needed information in the interactive document itself. This suffers due to the bloat in the document size making it undesirable to distribute.

In this regard, there is a need for efficient ways to provide interactive documents in a manner that reduces the bloat in document size.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, interactive document storage and delivery is provided. For several embodiments, a method is described comprising indexing context of a plurality of interactive points within an interactive document. The context of the interactive points within the document is then stored in a server such that it can be located by the server via the index. Furthermore, information may be received at the server identifying context data for an interactive point stored in the server upon a user activating the interactive point within the document. The server may then transmit to a client the context data stored by the server identified by the information received.

From an interactive document user standpoint, a point of interaction is activated within an interactive document and then a server is sent information identifying context data stored on the server for the point of interaction. Then the user receives the context data from the server. Also described are systems having means for performing the above methods. Other advantages and features of the invention are described below.

BRIEF DESCRIPTION OF THE DRAWINGS

The systems and methods for inline property editing in tree view based editors are further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
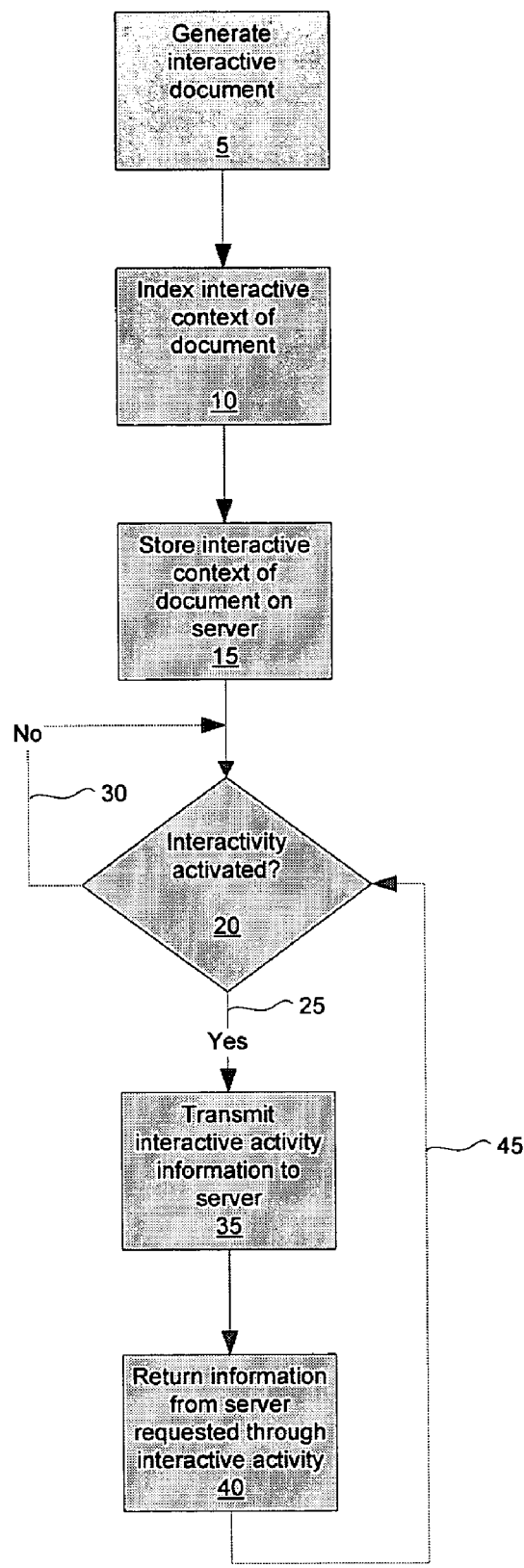
FIG. 1 is a flow chart illustrating a process for interactive document indexing, storage and retrieval.

Referring to FIG. 1, shown is a flow chart illustrating a process for interactive document indexing, storage and retrieval. (When reference is made herein to an interactive document, this is also reference to an interactive application.) An interactive document is generated 5 containing a variety of interactive information. This interactive information may include items such as HTTP or hypertext links, for example, to other documents or to locations of other documents or information. For example, when a user clicks on an HTTP link within a document, this returns other information to the user located elsewhere in the document or from other documents. The interactive information for the document is referred to as the interactive context for that document. This includes all of the information that would be returned when a user interacts with or activates a particular interactive portion of the document. When an interactive document is generated, interactive context of that document is indexed 10. Preferably, all of the interactive context for the document is indexed. How this information is indexed is discussed below further with in reference to FIGS. 3 and 4. This indexed interactive context is then stored 15 in a central server once the document is saved instead of saving it in the document itself.

Then, during a session with the document, it is determined 20 whether a user has interacted with the interactive document. If the user has interacted 25 with the document, such as by clicking on a portion of text, for example, then identification information is transmitted 35 to the server on which the interactive information for that document was stored. The server is then able to identify the context information for that portion of text that was clicked by using the transmitted information and return 40 the information requested through the interactive activity. If the user has not interacted with the document 30, the session continues to monitor 20 whether the user has performed such an action. The above process is repeated 45 each time the user activates an interactivity of the document.

Figure 2:
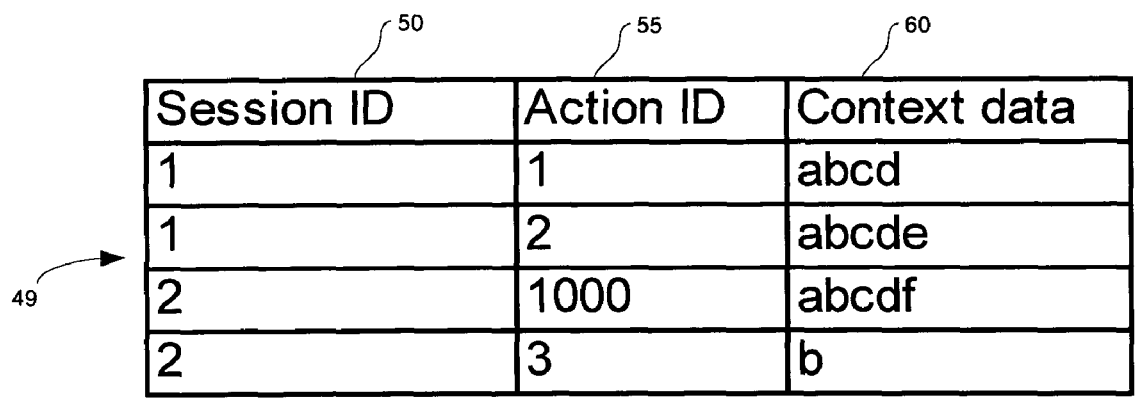
FIG. 2 is an exemplary table that may be stored in the server according to FIG. 1 having interactive context data therein for an interactive document.

Referring next to FIG. 2, shown is an exemplary table 49 that may be stored in the server according to FIG. 1 having interactive context data therein for an interactive document. Shown are columns for the Session ID 50, Action ID 55 and Context data 60 itself for that particular Session ID and Action ID. The Session ID is an identifier that uniquely identifies the session in which a user interacted with the document. The Action ID is an identifier that uniquely identifies a particular interactive point within the document associated with the Session ID. The Context data is that target data returned when a user activates a particular point of interactivity within an interactive document. This Context data is associated with a particular Session ID and Action ID. For example, Session ID 1 and Action ID 1 correspond to context Data "abcd" while Session ID 2 with Action ID 1000 correspond to Context data "abcdf." This table 49 is stored in the server such that the context data need not be stored in the interactive document itself. The interactive document need only have the Session ID 50 and Action ID 55 information to transmit to the server. Requirements of the server will depend on the number of interactive documents and how many interactive points each document has. For example, if each document has 1000 interactive points and the server generates 1000 documents a day with the context needed for each point being 1K, then the server needs to manage 1 Gigabyte of context per day.

Figure 3:
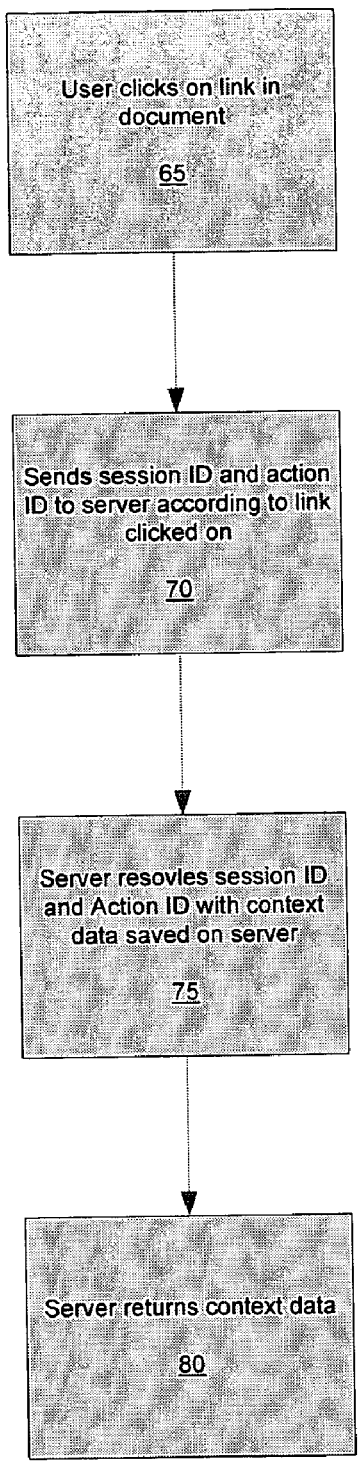
FIG. 3 is a flow chart illustrating a process for retrieval of information indexed and stored according to the process of FIG. 1.

Referring next to FIG. 3, shown is a flow chart illustrating a process for retrieval of information indexed and stored according to the process of FIG. 1. For example, a user clicks 65 on a link in an interactive document, such as an HTTP link. This sends 70 the Session ID that uniquely identifies the session and an Action ID that uniquely identifies the link within the document that the user clicked on. The server then resolves 75 the received Session ID and Action ID with target context data saved on the server using a table 49 such as that shown in FIG. 2. The server then returns 80 the applicable context data found in the table 49 to the user. The applicable context data may be saved on the serve indefinitely or be based upon a time limit of some sort, such as 6 months, or based upon a session expiration, for example.

Figure 4:
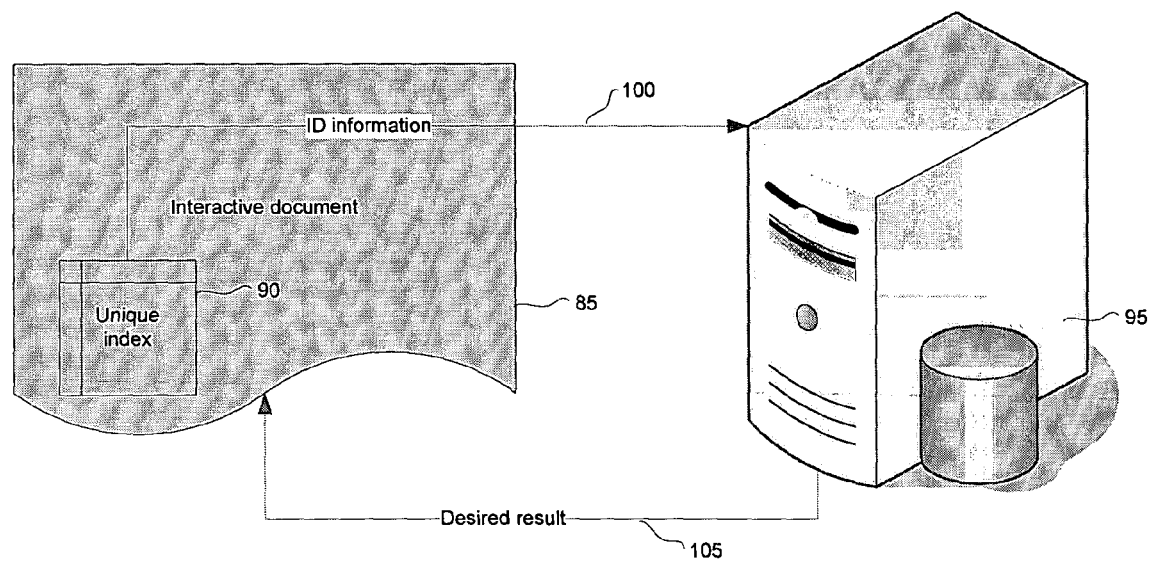
FIG. 4 is a system diagram illustrating an exemplary relationship between an interactive document and a server according to the processes of FIGS. 1 and 3.

Referring next to FIG. 4, shown is a system diagram illustrating an exemplary relationship between an interactive document and a server according to the processes of FIGS. 1 and 3. Shown is the interactive document 90 having a unique index 90 instead of context data and a server 95 that stores the context data of the interactive document 85. As explained above in further detail, the ID information is transmitted 100 from the unique index 90 to the server 95. The server 95 then returns 105 the desired result to the session in which the user is interacting with the document 85.

This results in the interactive document size being reduced significantly, enables more context to be used for better interactivity. For example, HTTP has a limited size for a GET request. This also results in little cost on the client if the interactivity is not used and enables the central management of the use of interactive documents because the resources of the server can be centrally managed.

Figure 5:
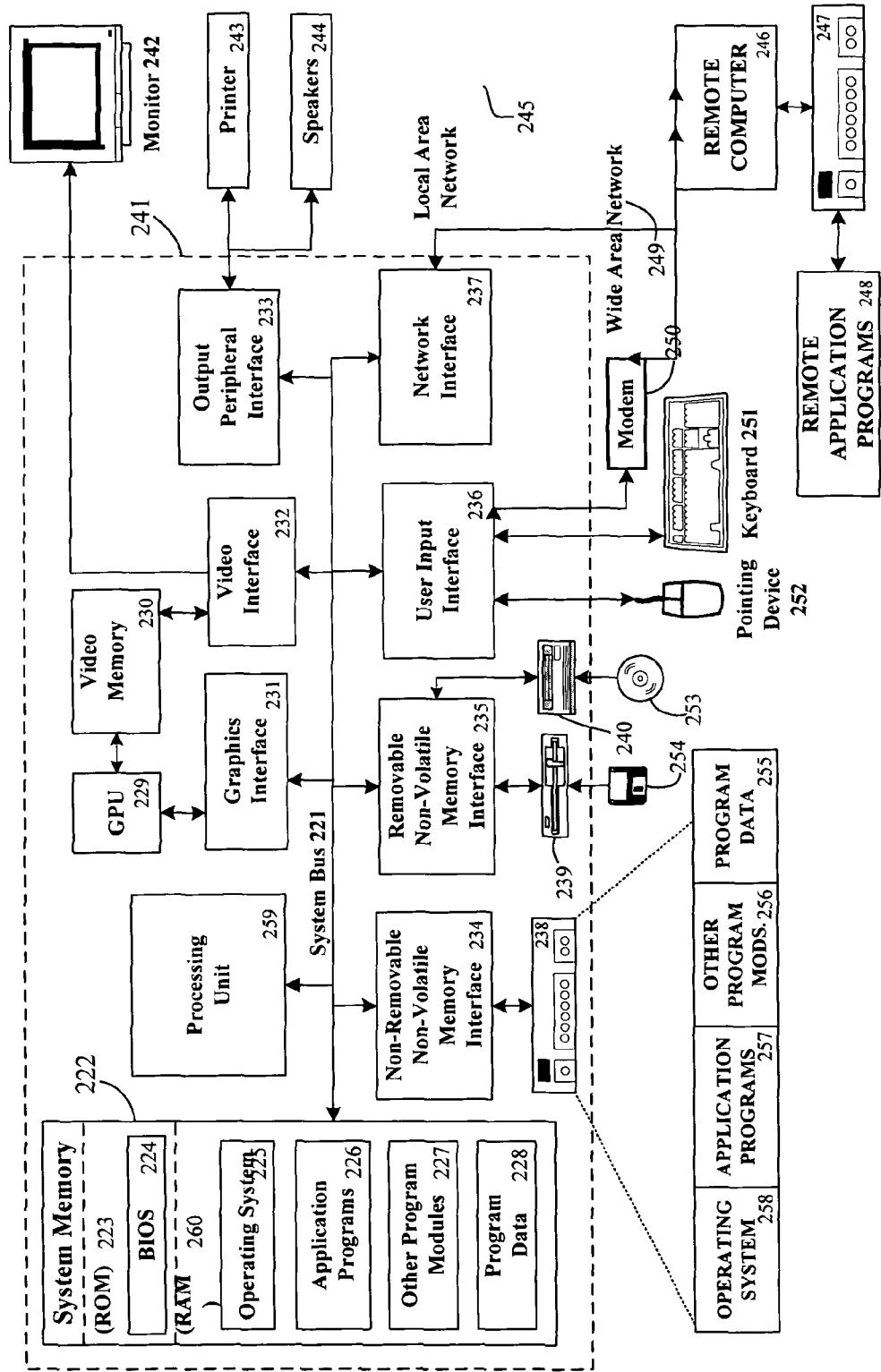
FIG. 5 is a block diagram representing an exemplary computing device suitable for use in conjunction with implementing the processes of FIGS. 1 and 3 of storage and retrieval of interactive context information.

Referring next to FIG. 5, shown is a block diagram representing an exemplary computing device suitable for use in conjunction with implementing the processes of FIGS. 1 and 3 of storage and retrieval of interactive context information. For example, the computer executable instructions that carry out the processes and methods for interactive document information storage and delivery may reside and/or be executed in such a computing environment as shown in FIG. 5. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 5 illustrates operating system 225, application programs 226, other program modules 227, and program data 228.

The computer 241 may also include other removable/non-removable, volatile/nonvolatile computer storage media. By way of example only, FIG. 5 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 5, provide storage of computer readable instructions, data structures, program modules and other data for the computer 241. In FIG. 5, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 5. The logical connections depicted in FIG. 5 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 5 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program (s) can be implemented in assembly or machine language, if desired. In any case, the language may be a compiled or interpreted language, and combined with hardware implementations.

Although exemplary embodiments may refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 6:
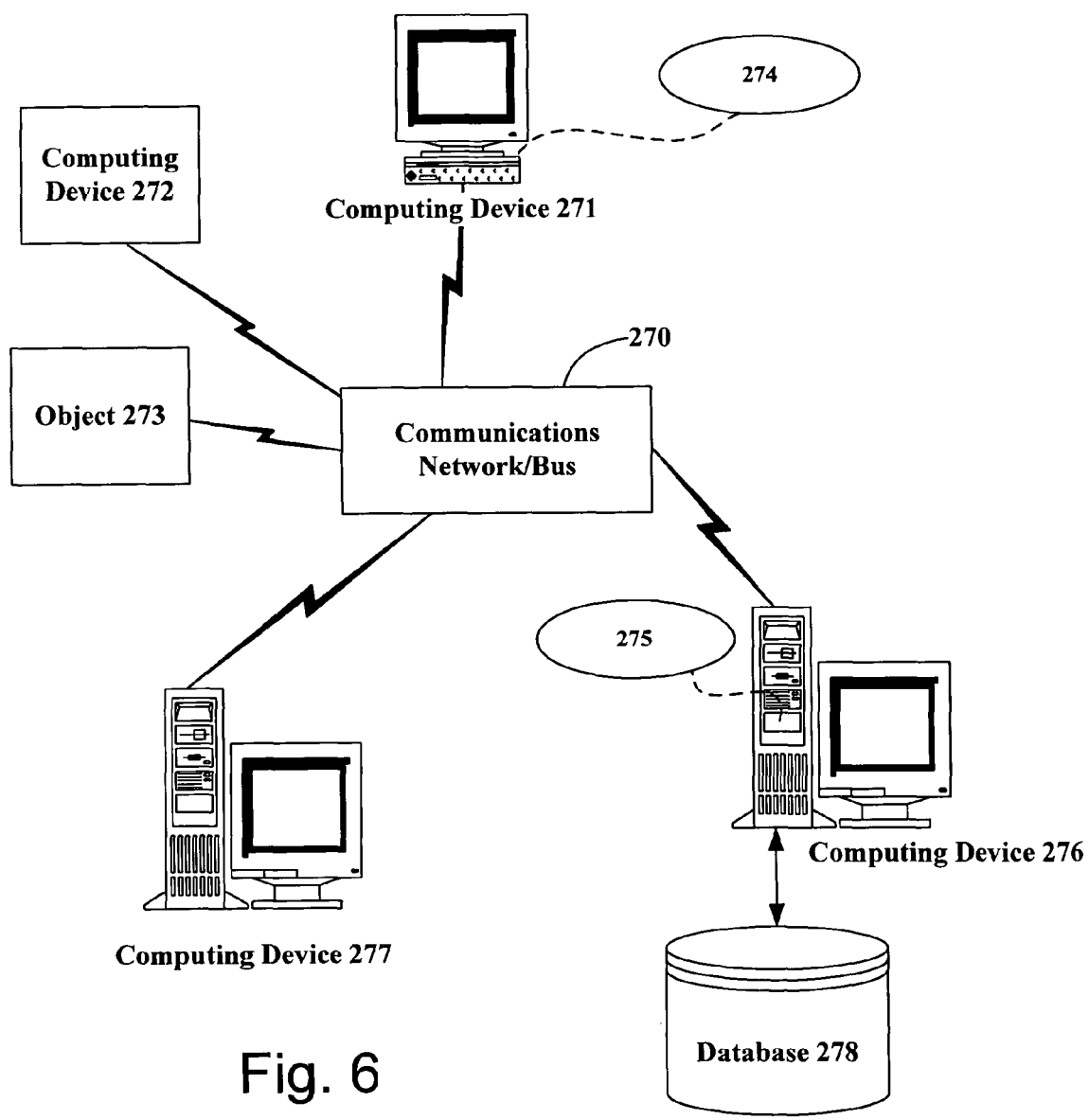
FIG. 6 illustrates an exemplary networked computing environment in which many computerized processes may be implemented to perform the processes of FIGS. 1 and 3 of storage and retrieval of interactive context information.

Referring next to FIG. 6, shown is an exemplary networked computing environment in which many computerized processes may be implemented to perform the processes of FIGS. 1 and 3 of storage and retrieval of interactive context information. For example, the server 95 of FIG. 4 may be part of such a networked environment with various clients on the network of FIG. 6 using and interacting with an interactive document such as that shown in FIG. 4. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 6 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 6, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 6, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 5 and the further diversification that can occur in computing in a network environment such as that of FIG. 6, the systems and methods provided herein cannot be construed as limited in any way to a particular computing architecture. Instead, the invention should not be limited to any single embodiment, but rather should be construed in breadth and scope in accordance with the appended claims.

What is claimed:

1. A method of accessing data over a data network comprising:

indexing context of a plurality of interactive points within an interactive document; and storing, by a server, the context of the plurality of interactive points within the interactive document in the server such that it can be located by the server via the index, the indexing comprising organizing context information based on a session identifier and an action identifier pertaining to an interactive point within the interactive document.

2. The method of claim 1 wherein all of the interactive points within the interactive document are indexed.

3. The method of claim 1 further comprising first generating the interactive document.

4. The method of claim 1 wherein the context information is target data of a link.

5. The method of claim 1 further comprising:
receiving at the server information identifying context data for an interactive point stored in the server upon a user activating the interactive point within the interactive document; and
transmitting from the server to a client the context data stored by the server identified by the information received.

6. The method of claim 5 wherein the information received is a session identifier and an action identifier pertaining to the interactive point within the interactive document.

7. A method comprising:
activating a point of interaction within an interactive document;
sending to a server information identifying context data stored on the server for the point of interaction; and
receiving the context data from the server.

8. The method of claim 7 wherein the context information is that of a link.

9. The method of claim 7 wherein the information sent is a session identifier and an action identifier pertaining to the point of interaction within the interactive document.

10. A system comprising a processor coupled to a memory, the memory having stored thereon instructions, the instructions when run by the processor cause the processor to:
index context of a plurality of interactive points within an interactive document; and
store the context of the plurality of interactive points within the interactive document in a server such that it can be located by the server via the index, the indexing comprises organizing context information based on a session identifier and an action identifier pertaining to an interactive point within the interactive document.

11. The system of claim 10 wherein all of the plurality of interactive points within the interactive document are indexed.

12. The system of claim 10 further comprising first generating the interactive document.

13. The system of claim 10 wherein the context information is target data of a link.

14. The system of claim 10 further comprising:
receive at the server information identifying context data for an interactive point stored in the server upon a user activating the interactive point within the interactive document; and
transmit from the server to a client the context data stored by the server identified by the information received.

15. The system of claim 14 wherein the information received is a session identifier and an action identifier pertaining to the interactive point within the interactive document.

16. The system of claim 10 further comprising:
activate a point of interaction within the interactive document;
send to a server information identifying context data stored on the server for the point of interaction; and
receive the context data from the server.

17. The system of claim 16 wherein the context information is that of an HTTP link.

18. The system of claim 16 wherein the information sent is a session identifier and an action identifier pertaining to the point of interaction within the interactive document.

19. A method of accessing data over a data network comprising:
indexing context data for a plurality of interactive points contained within a webpage, wherein the indexing comprises organizing context information based on a session identifier and an action identifier pertaining to an interactive point within the interactive document;
storing, by a server, the context data of the plurality of interactive points within the webpage in the server such that it can be located by the server via the index;
receiving at the server information identifying context data for a first interactive point stored in the server upon a user activating the first interactive point within the webpage; and
transmitting from the server to a client computing device the context data stored by the server for the first interactive point identified by the information received.

* * * * *